United States Patent [19]

Wallding et al.

[11] 4,381,193

[45] Apr. 26, 1983

[54] INTERNAL TREATMENT SYSTEM FOR GLASSWARE

[75] Inventors: Wayne A. Wallding, Horseheads; Leland Sills, Bath, both of N.Y.

[73] Assignee: Thatcher Glass Corporation, Greenwich, Conn.

[21] Appl. No.: 358,252

[22] Filed: Mar. 15, 1982

[51] Int. Cl.³ .......................................... C03B 35/00
[52] U.S. Cl. ...................................... 65/158; 65/159; 65/161; 65/181; 134/32; 137/458; 118/692
[58] Field of Search ................ 65/158, 161, 181, 159; 134/32; 118/692; 137/458

[56] References Cited

U.S. PATENT DOCUMENTS

| | | | |
|---|---|---|---|
| 3,709,672 | 1/1973 | DeSantis et al. | 65/30 |
| 4,252,146 | 2/1981 | Roger | 137/458 |
| 4,354,865 | 10/1982 | Poad et al. | 65/158 |

FOREIGN PATENT DOCUMENTS

| | | | |
|---|---|---|---|
| 2259413 | 12/1972 | Fed. Rep. of Germany | 65/161 |
| 2924264 | 6/1979 | Fed. Rep. of Germany | 118/692 |
| 1240650 | 8/1960 | France | 137/458 |
| 1434688 | 5/1976 | United Kingdom | 137/458 |

Primary Examiner—Arthur D. Kellogg
Attorney, Agent, or Firm—Jones & Askew

[57] ABSTRACT

An improved system for applying internal treatment gas in the manufacture of glassware such as bottles or the like. An independent primary treatment system and backup treatment system are disclosed, with each treatment system monitoring itself to detect malfunctions. The backup system is automatically actuated whenever the primary system malfunctions. Simultaneous malfunctions of both systems cause glassware to be rejected from the conveyor line for a predetermined period, producing a gap which pinpoints the arrival of possibly untreated ware.

7 Claims, 2 Drawing Figures

INTERNAL TREATMENT SYSTEM FOR GLASSWARE

FIELD OF THE INVENTION

This invention relates in general to a system for treating glassware, and relates in particular to a glassware internal treatment system having provisions for detecting and responding to failure of the treatment system.

BACKGROUND OF THE INVENTION

It is known in the art of glassware manufacture to treat newly-formed bottles or other glass articles, so as to produce a substantial improvement in the strength and durability of the articles. One such treatment comprises flowing a quantity of gaseous treatment fluid into the hot newly-formed glassware while still hot. A chemical reaction takes place between the internal treatment gas and the hot glassware, substantially improving certain physical qualities of the glassware without significantly altering the appearance of the glassware. Details of such glassware internal treatment, including the composition and application of internal treatment gases, are known to those skilled in the art, one example being U.S. Pat. No. 3,249,246.

Because bottles and other glassware are subjected to such internal treatment to improve the strength and durability of the articles, it is important to assure that all such articles during a manufacturing run actually are subjected to the prescribed amount of treatment gas. It is also important that untreated glassware be clearly identifiable if the internal treatment system should malfunction for any reason, so that untreated glassware lacking the improved physical characteristics are not inadvertently comingled with the treated glassware. This later problem of identifying untreated glassware is particularly difficult with treatment systems in which the treated and untreated articles are substantially the same in physical appearance, so that the untreated articles cannot readily be identified and separated by a visual inspection process.

In addition to the foregoing problems, it is desirable to provide some measure of redundency for a glassware internal treatment system so that a failure of the system does not always necessitate the expense and trouble of shutting down the glassware production line or separating all untreated articles.

SUMMARY OF THE INVENTION

Stated in general terms, the present invention comprises a glassware internal treatment system designed to monitor changes or disruptions in the flow of internal treatment gas, and to respond automatically to such changes or disruptions. The treatment system includes a primary system which monitors itself, and a secondary or backup system which automatically commences operation if the primary system malfunctions. The secondary system also monitors itself, and actuates a glassware rejection means whenever the backup system malfunctions during backup operation.

Stated somewhat more specifically, the present internal treatment system includes two separate and independent internal treatment systems, with each system independently monitoring itself of selected operating parameters. Under normal operation, the primary treatment system supplies the desired internal treatment gas mixture to glassware moving along a conveyor. If the gas flow in the primary system becomes disrupted, the secondary internal treatment system is automatically engaged to supply the internal treatment gas mixture to the glassware moving along the conveyor, at a location downstream from the treatment gas applied by the primary system. This downstream application of internal treatment gas from the backup system helps insure the proper treatment of glassware which may move past the primary system gas nozzle during the brief interval required for changeover from the primary to backup systems. If a malfunction in the backup system is detected after this changeover, the present invention automatically causes glassware to be rejected from the conveyor, thereby providing a gap of glassware which will pinpoint the arrival of possibly untreated ware downstream of the internal treatment system.

Accordingly, it is an object of the present invention to provide an improved internal treatment system for glassware.

It is another object of the present invention to provide a glassware internal treatment system having complete backup capability.

It is still another object of the present invention to provide a glassware internal treatment system which automatically monitors its performance, and responds to malfunctions in the system.

It is yet another object of the present invention to provide a glassware internal treatment system which indicates the presence and location of possibly untreated glassware when the system malfunctions.

Other objects and advantages of the present invention will become more readily apparent from the following description of a preferred embodiment.

DESCRIPTION OF PREFERRED EMBODIMENT

Figure 1:
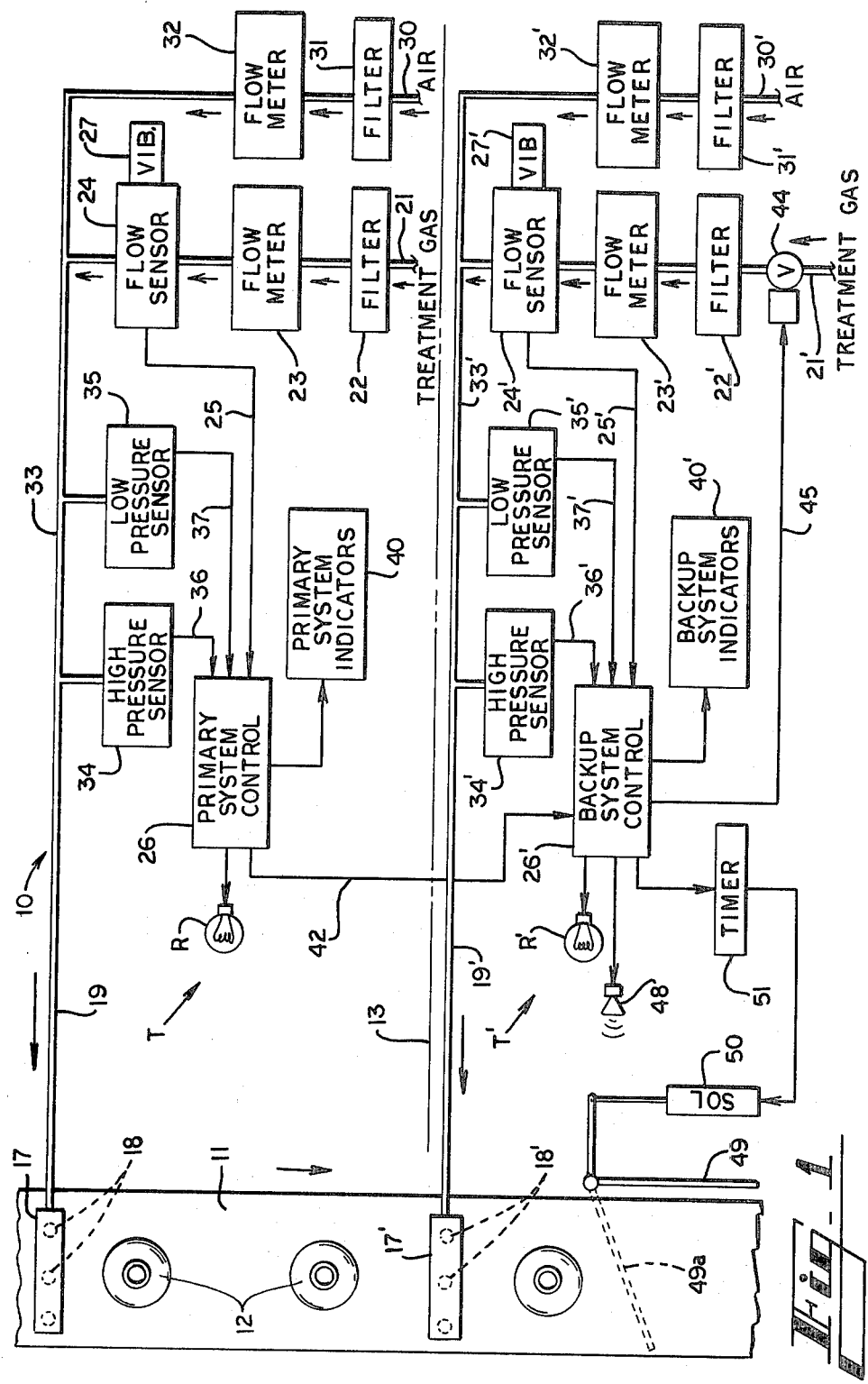
FIG. 1 is a plan view of a glassware internal treatment system according to a preferred embodiment of the present invention, including a fragmentary glassware conveyor and with control elements shown in functional form.

Turning first to FIG. 1, there is shown generally at 10 a glassware internal treatment system according to a disclosed embodiment of the present invention, disposed adjacent the conventional glassware conveyor 11 carrying a series of glassware articles 12 such as newly-manufactured bottles or the like. It will be understood that the depicted conveyor 11 is a portion of a glassware conveyor extending from a glassware forming machine located upstream of the conveyor, through the internal treatment system 10, and thereafter extending downstream to an annealing lehr for subsequent treatment of the glassware in a manner known to those skilled in the art.

The disclosed internal treatment system includes a primary system T which under normal operation supplies internal treatment gas to the articles 12 moving along the conveyor 11, and further includes a secondary or backup system T' which is automatically activated if the primary system malfunctions. The secondary treatment system T' of the disclosed system 10 duplicates elements and functions of the primary system T, and the two systems are symbolically separated on FIGS. 1 and 2 by the broken line 13. Moreover, primed numerals are used throughout to denote elements of the backup system T' corresponding to comparable elements of the primary system T.

Both the primary and secondary treatment systems have gas flow nozzles 17, 17' located a predetermined distance spaced above the glassware conveyor 11. The nozzles have one or more orifices 18, 18' facing downwardly toward the conveyor 11, and directing a flow of internal treatment gas toward the open mouths of the articles 12 moving therealong. The number, size, and spacing of orifices in each nozzle, and consequently the span of coverage by internal treatment gas flowing downwardly from the orifices, is determined by the diameter of opening (e.g., bottles openings) in the articles 12 being treated, and is also determined by the extent to which these articles can be aligned on the conveyor without causing jamming problems or damage to the hot bottles. In some cases, a single-orifice nozzle will be sufficient, while with smaller or less stable bottles a number of orifices per nozzle may be required to cover anticipated lateral misalignment of the glassware articles traveling along the conveyor.

The nozzle 17 is connected to receive gas through a line 19 extending from the nozzle to remainder of the primary system T. The gas supplied through the line 19 typically is a mixture of relatively-concentrated internal treatment gas of the kind described in the aforementioned patent, for example, mixed with a predetermined volume of dry air so as to dilute the concentrated internal treatment gas to the desired concentration required for treating the glassware 12 on the conveyor. The concentrated internal treatment gas is available in the tanks or cylinders of gas, and is supplied to the primary system T through the treatment gas line 21 which conducts the gas through a conventional filter 22 and regulating flow meter 23. It will be understood that a suitable pressure regulator (not shown) is provided to reduce the pressure of treatment gas from the supply tank.

The flow meter 23 is adjustable in a conventional manner to regulate the volume of internal treatment gas to a desired rate of flow. This metered flow of treatment gas enters the flow rate sensor 24, which provides a signal on the line 25 going to the primary control system 26 if the measured flow rate of treatment gas drops below a rate previously set in the flow rate sensor. The flow rate sensor 24 has an adjustable set point for selecting the minimum flow rate, so that the sensor signals the primary system control if the supply of treatment gas in the primary system runs empty or if the sensed rate of flow drops below the set point for any other reason. A vibrator 27 is mounted on the flow rate sensor 24 and energized for continuous operation in a manner described below, so as to smooth out the operation of the flow rate sensor.

A supply of dry air from any suitable source is supplied through the line 30 and filter 31 to the flow meter 32. The air flow meter 32 also is selectably adjustable to select the desired volume flow rate of air for combining with the selected volume of treatment gas, so that the combined flows of air and treatment gas provide the desired volume flowing to the nozzle 17.

The metered flows of treatment gas and air combine in the line 33 which extends via line 19 to the gas treatment nozzle 17. Connected to the line 33 are a high pressure sensor 34 and a low pressure sensor 35, each of which is responsive to the gas pressure in the combined air and treatment gas line leading to the nozzle 17. The high pressure sensor 34 is responsive to a sensed selectably adjustable high pressure in the line 33, and sends a signal along the line 36 to the primary system control 26 whenever the pressure in line 33 exceeds the selected high pressure. The low pressure sensor 35 likewise signals the primary system control along line 37 whenever the gas pressure in the line 33 falls below a certain selected low pressure. The high pressure sensor 34 thus responds to pressure increases caused by factors such as increases in air or treatment gas flow, or blockage in the line 19 or in an orifice 18 of the nozzle 17. The low pressure sensor 35 responds to decreases in air or treatment gas flow, to leakage in the lines or the nozzle, or similar factors.

The primary control system 26 receives inputs from the flow control sensor 24, high pressure sensor 34, and low pressure sensor 35 of the primary system T, and provides signals to the primary system indicators 40 to denote the operating status of the primary system. These primary system indicators 40, in a specific embodiment of the present invention, comprise individual indicator lights corresponding to the aforementioned flow sensor and pressure sensors; these indicator lights are energized to remain lit so long as the respective sensors are sensing normal flow and pressures. A malfunction in the primary system, detected by the primary system control 26, is immediately signaled by actuation of the flashing beacon 41, and the indicator light associated with the particular sensor becomes extinguished to denote the particular source of the sensed malfunction.

If the malfunction of the primary system T is determined by the primary system control 26, a signal is supplied along the line 42 to the backup system control 26' to commence operation of the backup system T'. The backup system control 26' turns on the solenoid valve 44 by way of control line 45, supplying treatment gas through the filter 22', flow meter 23', and flow sensor 24' of the backup system. Air from the supply line 30' is kept continuously flowing through the filter 32' and flow meter 32' to keep the backup system nozzle 17' purged and clear, so that treatment gas from the backup supply immediately commences mixing with the supply of air flowing through the line 19' to the backup nozzle. It will be understood that the rates of flow for the treatment gas and air in the backup system T' were previously set with the flow meters 23' and 32' to match the corresponding flows set with the primary system flow meters, so that the backup system T' is ready to commence immediate operation supplying treatment gas to the glassware through the nozzle 17'.

FIG. 1 illustrates that the backup system nozzle 17' is positioned a distance downstream from the primary system nozzle 17, in the direction of conveyor movement indicated by the arrow. This downstream location of the backup system nozzle 17' should be sufficient to prevent untreated glassware from moving beyond the backup nozzle during the brief time interval required for changeover from the primary system T to the backup system T'. This changeover time ordinarily is quite small, and is substantially determined by the time required for treatment gas to flow from the newly-opened solenoid valve 44 to the backup nozzle 17'.

The flow rate sensor 24', high pressure sensor 34', and low pressure sensor 35' each monitor the respective parameters of the backup system when in operation, and these sensors supply signals to the backup system control 26'. Normal operating status of the backup system is displayed by the backup system indicators 40', which may include three signal lights remaining lit to indicate normal operation of the flow rate sensor, high pressure sensor, and low pressure sensor.

If flow malfunction should be detected by any of the three sensors associated with the backup system T', the backup system control 26' energizes the backup flashing beacon R' and also the audible alarm horn 48. The backup system control also activates a glassware reject gate 49, which moves outwardly across the conveyor 11 to the "reject" position 49a shown in broken line, so that untreated glassware is removed from the conveyor. The reject gate 49, which remains retracted alongside the conveyor 11 during normal operation of the treatment system, is actuated by the solenoid 50 in response to a signal from the backup control system. The solenoid actuating signal is supplied through the timer 51 which in effect overrides the reject signal from the backup system control and deactivates the reject gate 49 a set period of time after malfunction of the backup system T' is detected.

Figure 2:
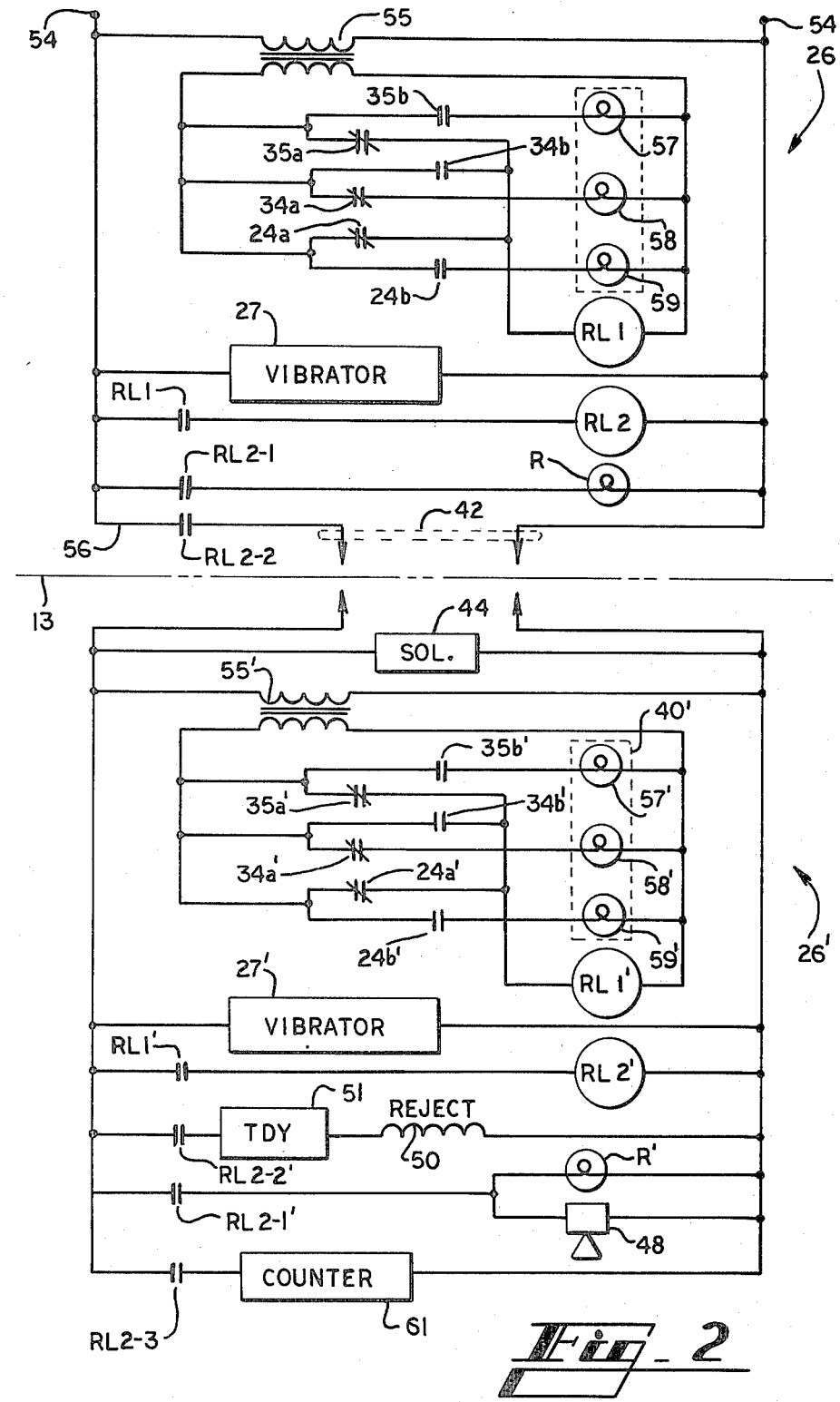
FIG. 2 is a schematic view showing the electric control circuit of the disclosed embodiment.

Turning now to FIG. 2, the electrical control circuit of the disclosed embodiment is discussed in detail. This control circuit is divided into two portions, namely, the primary system circuit 26, and the backup system circuit 26' shown below the line 13 denoting the separation between primary and backup systems.

The control circuit is connected at terminals 54 to a suitable source of operating power, activating the primary winding of the low-voltage transformer 55 which supplies relatively low voltage (e.g., 28 volts) to portions of the primary control system. Power also is supplied to the vibrator 27 at this time. The normally-open relay contact RL2-2 in the line 56 leading to the line 42 interconnecting the primary and secondary control systems maintains the secondary control system 26' deenergized at this time. As previously described, air flows through the secondary system T' at all times while the overall system 10 is in operation; this continuing airflow in the backup system takes place independently of the backup control system 26'.

Assuming the primary control system 26 is functioning properly, the normally-closed contact 24a and normally-open contact 24b of the flow rate sensor 24 are maintained reversed from their normal positions shown in FIG. 2. Likewise, the normally-closed contact 35a and normally-open contact 35b of the low pressure sensor 35 are reversed as shown in that Figure. The normally-closed contact 34a and normally-open contact 34b of the high pressure sensor 35 maintain their depicted normal positions at this time. The indicator lights 57, 58, and 59 of the primary signal indicator 40 are all lit, indicating normal operation of the primary system T.

If any one or more of the primary system sensors detects a parameter outside a preset limit, the two contacts associated with that sensor change state to extinguish the signal light associated with that sensor, and apply operating current to the low-voltage relay RL1. This relay closes the corresponding relay contact which energizes power relay RL2, closing the normally-open relay contact RL2-2 to apply operating power on the line 42 to the backup control system 26'. The normally-open relay contact RL2-1 also closes at this time, illuminating the beacon R to signal the failure of the primary system T.

The normally-closed solenoid valve 44 in the treatment gas line 21' of the backup system is immediately actuated when the relay contact RL2-2 closes, supplying treatment gas to the backup system. The vibrator 27' associated with the flow rate sensor 24' of the backup system also is energized at this time. Assuming normal operation of the backup system as determined by the flow rate sensor and the two pressure sensors, the backup system continues to apply treatment gas to glassware moving on the conveyor while the primary treatment system receives repairs or a fresh supply of treatment gas.

If any malfunction of gas flow is detected in the backup system 26', the corresponding signal lamp 57'-59' is extinguished and the low-voltage relay RL1' is energized to turn on the relay RL2'. Relay contact RL2-1' closes to actuate the beacon R' and the alarm horn 48, alerting personnel that both primary and secondary systems have failed. At the same time, power is applied through the now-closed relay contact RL2-2' to the solenoid 50, thereby moving the reject gate 49 (FIG. 1) across the path of oncoming glassware on the conveyor. The elapsed-time counter 61 is energized by the now-closed relay contact RL2-3 to keep track of the total time that glassware may have missed treatment, namely, the time that both the primary and secondary systems were malfunctioning.

The timer 51 connected in series with the solenoid 51 is a time-delay relay which maintains a closed circuit for a set period of time when actuated, but which opens to disable the glassware reject circuit after this set period of time expires. Thus, the reject gate 49 returns to its normal position to one side of the conveyor after a set period of time, even though both primary and backup systems remain inoperative. This timed operation of the reject gate thus creates a gap in bottles traveling to the annealing lehr, so as to pinpoint the arrival of possibly untreated glassware when both systems malfunction. If the reject gate remained operative for any substantial length of time, the machine floor could conceivably be buried by glassware rejected from the conveyor for a potentially long period of time.

It will thus be seen that the present glassware internal treatment system provides a complete backup treatment system which immediately and automatically commences operating whenever the primary system malfunctions. Glassware which missed treatment from a suddenly-inoperative primary system nonetheless receives treatment gas from the operative backup system, due to the offset along the conveyor of the nozzle for the backup system.

Although the disclosed mechanism for rejecting glassware is a gate which is physically positionable across the path of oncoming glassware, other expedients may be utilized for moving glassware from the conveyor. For example, a blowoff nozzle may be positioned alongside the conveyor, and connected to a suitable source of air pressure through a solenoid-controlled valve connected in the same circuit as the reject solenoid 50 disclosed herein.

It should also be understood that the foregoing relates to but a preferred embodiment of the present invention, and that numerous changes and modifications may be made therein without departing from the spirit or scope of the invention as defined in the following claims.

We claim:
1. Apparatus for treating glassware, comprising:
   primary means operative to apply a fluid treatment to the glassware;

secondary means selectably operative to apply said fluid treatment to the glassware, said secondary means being normally nonoperative, means responsive to the failure of said primary means to initiate operation of said secondary means; and means responsive to failure of said secondary means to reject the glassware untreated by either the primary or secondary means.

2. Apparatus for applying a fluid treatment to glassware moving along a path, comprising:

primary treatment means operative to apply fluid treatment to glassware at a selected first location on the path;

secondary treatment means selectably operative to apply said fluid treatment to glassware at a selected second location on the path downstream from said first location, said secondary means normally being nonoperative;

means responsive to a failure condition of said primary treatment means to initiate operation of said secondary treatment means; and means responsive to a failure condition of said secondary treatment means to reject glassware untreated by either the primary or secondary treatment means.

3. Apparatus as in claim 2, wherein said reject means is operative in response to a failure condition of said secondary treatment means to reject only enough glassware to create a significant gap in the glassware moving along said path, so that glassware untreated by either said primary or secondary treatment systems can move along said path without rejection after said gap.

4. Apparatus as in claim 2, wherein:

said means to reject glassware is located downstream from said second location so as to reject glassware moved past said first and second treatment locations without receiving said fluid treatment at either location.

5. Apparatus as in claim 4, wherein said reject means is operative to deflect glassware from said path in response to failure of said secondary treatment means, so that untreated glassware is removed from the path.

6. Apparatus as in claim 4, wherein said rejection means comprises:

glassware removal means selectably operative to remove glassware from said path; and means operative in response to a failure condition of said secondary treatment means to operate said glassware removal means only to remove enough glassware to create a significant gap in the glassware moving along the path.

7. Apparatus as in claim 2, wherein said fluid treatment comprises a mixture of air and a treatment gas and wherein:

said secondary treatment means comprises fluid dispensing means at said second location;

means selectably operative to supply said treatment gas to said fluid dispensing means in response to failure of said primary treatment means; and means operative to supply air to said fluid dispensing means at all times during operation of the fluid treatment apparatus, so that the dispensing means is kept purged by air flowing therethrough whether or not said treatment gas is supplied to the dispensing means.

* * * * *